US009820181B2

(12) United States Patent
Quan et al.

(10) Patent No.: US 9,820,181 B2
(45) Date of Patent: Nov. 14, 2017

(54) DATA OFFLOAD TRANSMISSION METHOD, APPARATUS AND SYSTEM

(71) Applicant: Huawei Technologies Co., Ltd., Shenzhen (CN)

(72) Inventors: Wei Quan, Shenzhen (CN); Weiwei Song, Shenzhen (CN); Yu Wang, Shenzhen (CN); Jian Zhang, Shenzhen (CN); Yi Jiang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 244 days.

(21) Appl. No.: 14/541,832

(22) Filed: Nov. 14, 2014

(65) Prior Publication Data
US 2015/0071228 A1  Mar. 12, 2015

Related U.S. Application Data

(63) Continuation of application No. PCT/CN2013/075145, filed on May 3, 2013.

(30) Foreign Application Priority Data

May 16, 2012  (CN) .......................... 2012 1 0152002

(51) Int. Cl.
*H04W 4/00* (2009.01)
*H04W 28/02* (2009.01)
*H04W 28/08* (2009.01)

(52) U.S. Cl.
CPC ....... *H04W 28/0268* (2013.01); *H04W 28/02* (2013.01); *H04W 28/08* (2013.01)

(58) Field of Classification Search
CPC .............................. H04L 45/38; H04W 36/22
(Continued)

(56) References Cited

U.S. PATENT DOCUMENTS 7,583,625 B2 * 9/2009 Bennett ................. H04W 52/24
370/311
8,583,123 B2 * 11/2013 Chang ............... H04W 36/0083
455/442
(Continued)

FOREIGN PATENT DOCUMENTS

CN         1893302 A    1/2007
CN       101635588 A    1/2010
(Continued)

OTHER PUBLICATIONS

Tervonen, "Deliverable DA2.2.22 Offloading Traffic from Cellular Networks with PBRM", v1.0, ICT SHOK Future Internet Programme (ICT SHOK FI) Phase 2: 1.6.2009-31.12.2010, Jun. 30, 2010, 39 pages.

(Continued)

*Primary Examiner* — Ricky Ngo
*Assistant Examiner* — Dewanda Samuel
(74) *Attorney, Agent, or Firm* — Brinks Gilson & Lione

(57) ABSTRACT

Embodiments of the present invention provide a data offload transmission method, apparatus and system, which relate to the field of communications and may avoid multiple collisions and retransmissions, to reduce the transmission time delay of uplink data. The method includes: obtaining, by a base station, a transmission performance parameter of user equipment on a supplementary network, configuring a user transmission restriction according to the transmission performance parameter and sending the user transmission restriction to the user equipment, for enabling the user equipment to perform data transmission on the supplementary network according to the user transmission restriction. The method provided by the embodiments of the present invention is applied to data offload transmission.

18 Claims, 5 Drawing Sheets

(58) Field of Classification Search
USPC .................................................. 370/235, 331
See application file for complete search history.

(56) References Cited

U.S. PATENT DOCUMENTS

| | | | |
|---|---|---|---|
| 9,094,864 B2* | 7/2015 | Payyappilly | H04L 12/4633 |
| 9,414,281 B2* | 8/2016 | Liu | H04W 36/22 |
| 2004/0008627 A1* | 1/2004 | Garg | H04L 12/5695 370/235 |
| 2004/0023669 A1* | 2/2004 | Reddy | H04W 36/32 455/456.1 |
| 2007/0178906 A1* | 8/2007 | Gao | H04W 48/18 455/453 |
| 2011/0320588 A1* | 12/2011 | Raleigh | H04W 36/245 709/224 |
| 2012/0224485 A1* | 9/2012 | Payyappilly | H04L 12/4633 370/235 |
| 2015/0382269 A1* | 12/2015 | Liang | H04W 24/02 370/332 |

FOREIGN PATENT DOCUMENTS

| | | |
|---|---|---|
| CN | 102014372 A | 4/2011 |
| CN | 102387576 A | 3/2012 |
| EP | 2709418 A2 | 3/2014 |
| WO | WO 2011/149533 A1 | 12/2011 |
| WO | WO 2011/157129 A2 | 12/2011 |

OTHER PUBLICATIONS

Qualcomm, "A 3G/LTE Offload Framework: Connectivity Engine (CnE) to Manage Inter-System Radio Connections and Applications" Jun. 2011, 54 pages.

Lte, "$3^{rd}$ Generation Partnership Project; Technical Specification Group Radio Access Network; Evolved Universal Terrestrial Radio Access (E-UTRA); Medium Access Control (MAC) protocol specification" (Release 10) 3GPP TS 36.321, V10.5.0, Mar. 2012, 54 pages.

Lte, "$3^{rd}$ Generation Partnership Project; Technical Specification Group Radio Access Network; Evolved Universal Terrestrial Radio Access (E-UTRA); Radio Resource Control (RRC); Protocol specification" (Release 10) 3GPP TS 36.331, V10.5.0, Mar. 2012, 302 pages.

* cited by examiner

DATA OFFLOAD TRANSMISSION METHOD, APPARATUS AND SYSTEM

CROSS-REFERENCE TO RELATED APPLICATIONS

This application is a continuation of International Application No. PCT/CN2013/075145, filed on May 3, 2013, which claims priority to Chinese Patent Application No. 201210152002.3, filed on May 16, 2012, both of which are hereby incorporated by reference in their entireties.

FIELD OF THE INVENTION

The present invention relates to the field of communications, and in particular to a data offload transmission method, apparatus and system.

BACKGROUND OF THE INVENTION

With the increasing of mobile internet services, data quantity of wireless communication network is increasing sharply. In order to relief network congestion, network operators adopt a data offload manner to offload a part of service data in the communication network to other available supplementary networks, such as WiFi (Wireless Fidelity, wireless fidelity) network, home base station network and an iMB (integrated Mobile, integrated mobile boardcasting) network, etc. The specific data offload manner between user equipment and the communication network is as follows: a part of data in transmission data of the user equipment and a base station in the communication network are directly transmitted by an air interface of the network, and the other part of data are transmitted by a supplementary network.

When the user equipment performs uplink data transmission to the supplementary network, an adopted upload mechanism is a DCF (Distributed Coordinated Function, distributed coordination function), the DCF provides standard competitive services, and the specific transmission rules are as follows: when the user equipment has data transmission, the user equipment detects whether a transmission channel is idle, if the transmission channel is busy, the user equipment continues the detection, and when detecting the transmission channel is idle and the idle time is longer than a DIFS (Distributed interframe space, distributed interframe space), the user equipment starts the data transmission; and if the restriction time is shorter than the DIFS, the user equipment will perform exponential backoff. If the user equipment detects that the transmission channel is idle, the user equipment may directly initiate uplink transmission.

In a process of realizing that the user equipment uploads data, the inventors have found that at least the following problems exist in the prior art: during the uplink transmission of the user equipment on the supplementary network, the uplink data of multiple user equipment may be sent at the same moment to generate collision. At this time, the worst result is that the base station could not correctly receive the uplink data of any user equipment. Retransmission after collision is still in a competitive manner, and the collision may happen again. For data with higher QoS (Quality of Service, quality of service) requirements, multiple collisions and retransmissions increase the transmission time delay of the uplink data.

SUMMARY OF THE INVENTION

The embodiments of the present invention provide a data offload transmission method, apparatus and system, which may avoid multiple collisions and retransmissions, to reduce the transmission time delay of uplink data.

To fulfill the above-mentioned objectives, the embodiments of the present invention adopt the following technical solutions:

A data offload transmission method, including:
a base station obtains a transmission performance parameter of user equipment on a supplementary network; and
the base station configures a user transmission restriction according to the transmission performance parameter and sends the user transmission restriction to the user equipment, for enabling the user equipment to perform data transmission on the supplementary network according to the user transmission restriction.

A data offload transmission method, including:
user equipment receives a user transmission restriction sent by a base station; and
the user equipment performs data transmission on a supplementary network according to the user transmission restriction.

A base station, including:
an obtaining unit, configured to obtain a transmission performance parameter of user equipment on a supplementary network;
a configuring unit, configured to configure a user transmission restriction according to the transmission performance parameter; and
a first sending unit, configured to send the user transmission restriction to the user equipment, for enabling the user equipment to perform data transmission on the supplementary network according to the user transmission restriction.

User equipment, including:
a first receiving unit, configured to receive a user transmission restriction sent by a base station; and
a transmitting unit, configured to perform data transmission on a supplementary network according to the user transmission restriction.

A data offload transmission system, including a base station and user equipment;
the base station is the above-mentioned base station; and
the user equipment is the above-mentioned user equipment.

A data offload transmission method, including:
user equipment receives a transmission restriction event sent by a base station;
the user equipment measures a transmission performance parameter corresponding to the transmission restriction event; and
the user equipment executes the transmission restriction event according to the transmission performance parameter.

A data offload transmission method, including:
a base station sends a transmission restriction event to user equipment, for enabling the user equipment to measure a transmission performance parameter corresponding to the transmission restriction event and execute the transmission restriction event according to the transmission performance parameter.

User equipment, including:
a second receiving unit, configured to receive a transmission restriction event sent by a base station;
a measuring unit, configured to measure a transmission performance parameter corresponding to the transmission restriction event; and
an executing unit, configured to execute the transmission restriction event according to the transmission performance parameter.

A base station, including:

a sending unit, configured to send a transmission restriction event to user equipment, for enabling the user equipment to measure a transmission performance parameter corresponding to the transmission restriction event and execute the transmission restriction event according to the transmission performance parameter.

A data offload transmission system, including a base station and user equipment;

the user equipment is the above-mentioned user equipment; and the base station is the above-mentioned base station.

The data offload transmission method, apparatus and system provided by the above-mentioned technical solutions, by scheduling uplink transmission of the user equipment on the supplementary network through the base station, may avoid multiple collisions and retransmissions, to reduce the transmission time delay of uplink data.

BRIEF DESCRIPTION OF THE DRAWINGS

To illustrate technical solutions in the embodiments of the present invention or in the prior art more clearly, a brief introduction on the accompanying drawings which are needed in the description of the embodiments or the prior art is given below. Apparently, the accompanying drawings in the description below are merely some of the embodiments of the present invention, based on which other drawings may be obtained by those of ordinary skill in the art without any creative effort.

DETAILED DESCRIPTION OF THE EMBODIMENTS

A clear and complete description of technical solutions in the embodiments of the present invention will be given below, in combination with the accompanying drawings in the embodiments of the present invention. Apparently, the embodiments described are merely a part, but not all, of the embodiments of the present invention. All of other embodiments, obtained by those of ordinary skill in the art based on the embodiments in the present invention without any creative effort, fall into the protection scope of the present invention.

Embodiment 1

Figure 1:
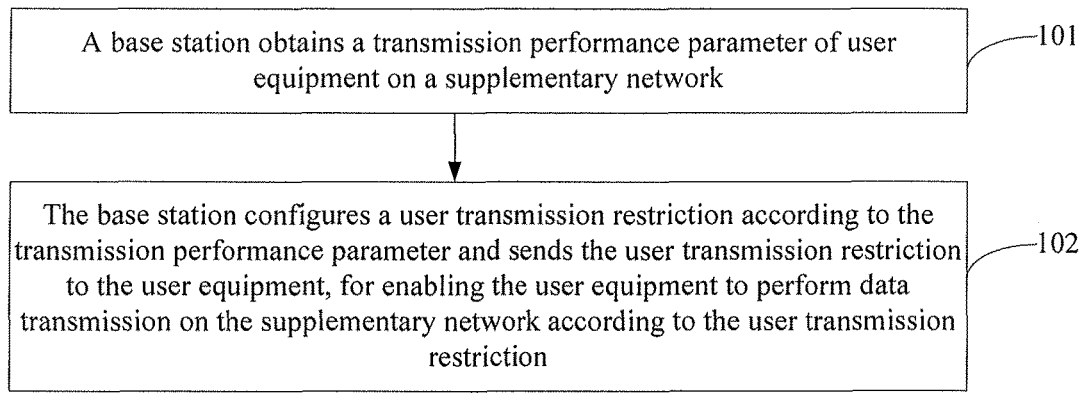
FIG. 1 is a schematic diagram of a flow of a data offload transmission method provided by an embodiment 1.

The embodiment of the present invention provides a data offload transmission method, the method is applied to a base station side, and as shown in FIG. 1, the method includes the following steps:

101. a base station obtains a transmission performance parameter of user equipment on a supplementary network.

During data offload transmission, in order to avoid multiple collisions and retransmissions of data transmission of the user equipment on the supplementary network, the base station may schedule the transmission of the user equipment on the supplementary network, and the base station needs to obtain the transmission performance parameter of the user equipment on the supplementary network during scheduling. The transmission performance parameter includes at least one of parameters of data transmission time delay and a signal quality parameter. Wherein, the signal quality parameter includes an RSSI (Received Signal Strength Indication, received signal strength indication), of course, the signal quality parameter may also be other parameters capable of indicating the quality of a signal, in the embodiment, we take the RSSI as an example of the signal quality parameter. The data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal quality parameter is the RSSI, the RSSI herein may be the average/maximal/minimal RSSI of the user equipment within the measurement cycle, and is not limited herein.

Optionally, the base station obtains the transmission performance parameter in two manners: one is that the base station itself measures the transmission performance parameter; and the other is that the user equipment reports the transmission performance parameter to the base station after measuring the same. Further, when the user equipment reports the transmission performance parameter to the base station after measuring the same, the base station may send a parameter reporting indication to the user equipment, for enabling the user equipment to report the transmission performance parameter to the base station according to the parameter reporting indication; or the user equipment independently reports the transmission performance parameter to the base station.

102. The base station configures a user transmission restriction according to the transmission performance parameter and sends the user transmission restriction to the user equipment, for enabling the user equipment to perform data transmission on the supplementary network according to the user transmission restriction.

The base station configures the user transmission restriction according to the transmission performance parameter, specifically including:

If the transmission performance parameter satisfies: the data transmission time delay exceeds a preset time delay threshold 1 and/or the RSSI is lower than a preset RSSI threshold 1, then the user transmission restriction is that the user equipment stops the data transmission on the supplementary network. If the transmission performance parameter satisfies: the data transmission time delay exceeds a preset time delay threshold 2 and/or the RSSI is lower than a preset RSSI threshold 2, then the user transmission restriction is that the user equipment decreases a data segment length to a preset segment value. Wherein, the preset time delay threshold 1 is larger than the preset time delay threshold 2; and the preset RSSI threshold 1 is lower than the preset RSSI threshold 2. When the data transmission time delay exceeds the preset time delay threshold 1 and/or the RSSI is lower than the preset RSSI threshold 1, it indicates that the data transmission quality between the user equipment and the base station is the poorest, at this time, the user transmission restriction configured for the user equipment by the base station is to enable the user equipment to stop the data transmission on the supplementary network, so as to avoid frequent collision, reduce the data transmission delay of uplink transmission of the user equipment and improve the system performance. If not, the user equipment starts data transmission. When the data transmission time delay exceeds the preset time delay 2 and/or the RSSI is lower than the preset RSSI value 2, it indicates that the data transmission quality between the user equipment and the base station is relatively poor, at this time, the user transmission restriction configured for the user equipment by the base station is to enable the user equipment to decrease the data segment length to the preset segment value; namely, an uplink transmission data packet is divided into smaller segments for transmission, which may reduce interference on a channel where access network equipment is located, and improve the offload data transmission quality. Optionally, the transmission performance parameter may further include a new transmission and/retransmission data size on supplementary network equipment. Wherein, when newly transmitting data to the supplementary network, the user equipment may send, to the base station, the data size of the new transmission data, namely a new transmission data size; when retransmitting certain data to the supplementary network, the user equipment may also send the data size of the retransmission data to the base station; of course, when the new transmission and/or retransmission data size onto the supplementary network equipment is larger than a set threshold, the user equipment may also report the new transmission and/or retransmission data size to the base station. When the data transmission time delay exceeds the preset time delay threshold 2 and/or the RSSI is lower than the preset RSSI threshold 2, the user transmission restriction is to enable the user equipment to decrease the data segment length to the preset segment value. Wherein, the preset segment value may be set by the base station according to the new transmission and/or retransmission data size on the supplementary network equipment.

Optionally, the base station configures the user transmission restriction according to the transmission performance parameter, wherein the user transmission restriction may further include: the number of transmissions of the user equipment on the supplementary network; or start of data transmission by the user equipment at a preset moment. The base station may configure the number of transmissions on the supplementary network equipment. The user equipment monitors the busy-idle condition of the channel where the supplementary network equipment is located. When the user equipment monitors that the channel, where the supplementary network equipment is located, is idle, the user equipment performs once transmission. When the user equipment reaches the number of transmissions configured by the base station, the user equipment stops the transmission on the supplementary network equipment. Optionally, the base station configures a specific transmission moment of the user equipment on the access network equipment. For example, the base station may configure the transmission moment through an SFN (System Frame Number, system frame number) and a subframe number, may also notify the user equipment of immediately starting once or multiple transmissions on the access network equipment through a PDCCH (physical downlink control channel, physical downlink control channel). At this time, the user equipment does not need to detect the busy-idle condition of the channel where the supplementary network equipment is located, and directly starts uplink transmission. By means of scheduling of the base station, collision may be avoided when the user equipment uploads data on the supplementary network, the uplink transmission time delay is reduced, and the system performance is improved.

Figure 2:
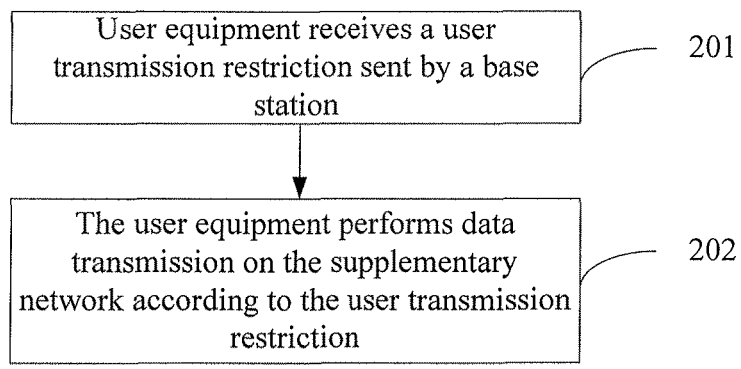
FIG. 2 is a schematic diagram of a flow of another data offload transmission method provided by the embodiment 1.

The embodiment of the present invention provides a data offload transmission method, the method is applied to a user equipment side, and as shown in FIG. 2, the method includes the following steps:

201. user equipment receives a user transmission restriction sent by a base station.

After obtaining a transmission performance parameter of the user equipment on a supplementary network, the base station configures the user transmission restriction according to the transmission performance parameter, and sends the user transmission restriction to the user equipment. The base station obtains the transmission performance parameter in two manners: one is that the base station itself measures the transmission performance parameter; and the other is that the user equipment reports the transmission performance parameter to the base station after measuring the same. Further, when the user equipment reports the transmission performance parameter to the base station after measuring the same, the base station may send a parameter reporting indication to the user equipment, for enabling the user equipment to report the transmission performance parameter to the base station according to the parameter reporting indication; or the user equipment independently reports the transmission performance parameter to the base station.

Wherein, the transmission performance parameter includes at least one of parameters of data transmission time delay and a signal quality parameter. Wherein, the signal quality parameter includes an RSSI, of course, the signal quality parameter may also be other parameters capable of indicating the quality of a signal, in the embodiment, the signal quality parameter adopted by us is the RSSI. The data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is the RSSI, the signal strength herein may be the average/maximal/minimal RSSI of the user equipment within the measurement cycle, and is not limited herein. Optionally, the user equipment may also send a new transmission and/or retransmission data size of the user equipment on the supplementary network equipment to the base station. Wherein, when newly transmitting data to the supplementary network, the user equipment may send, to the base station, the data size of the new transmission data, namely a new transmission data size; when retransmitting certain data to the supplementary network, the user equipment may also send the data size of the retransmission data to the base station; of course, when the new transmission and/or retransmission data size onto the supplementary network equipment is larger than a set threshold, the user equipment may also report the new transmission and/or retransmission data size to the base station. When the data transmission time delay exceeds a preset time delay threshold 2 and/or the RSSI is lower than a preset RSSI threshold 2, the user transmission restriction is to enable the user equipment to decrease the data segment length to a preset segment value. Wherein, the preset segment value may be set by the base station according to the new transmission and/or retransmission data size on the supplementary network equipment.

After obtaining the transmission performance parameter, the base station judges the transmission quality between the user equipment and the base station according to the transmission performance parameter, configures the user transmission restriction hereby and sends the user transmission restriction to the user equipment. If the transmission performance parameter satisfies: the data transmission time delay exceeds a preset time delay threshold 1 and/or the RSSI is lower than a preset RSSI threshold 1, then the base station configures the user transmission restriction in such a manner that the user equipment stops the data transmission on the supplementary network; if the transmission performance parameter satisfies: the data transmission time delay exceeds the preset time delay threshold 2 and/or the RSSI is lower than the preset RSSI threshold 2, then the base station configures the user transmission restriction in such a manner that the user equipment decreases a data segment length to a preset segment value; or, the base station configures the user transmission restriction according to the transmission performance parameter as follows: the number of transmissions of the user equipment on the supplementary network; or start of data transmission by the user equipment at a preset moment. The user equipment receives the user transmission restriction.

202. The user equipment performs data transmission on the supplementary network according to the user transmission restriction.

After receiving the user transmission restriction, the user equipment immediately performs data transmission on the supplementary network according to the user transmission restriction, if the user transmission restriction is that the user equipment stops the data transmission on the supplementary network, the user equipment stops the data transmission; if the user transmission restriction is that the user equipment decreases the data segment length to the preset segment value, the user equipment divides the transmission data into segments according to the preset segment value for transmission; if the user transmission restriction is the number of transmissions of the user equipment on the supplementary network or start of data transmission by the user equipment at the preset moment, the user equipment monitors the busy-idle condition of the channel where the supplementary network equipment is located. When the user equipment monitors that the channel, where the supplementary network equipment is located, is idle, the user equipment performs once transmission. When the user equipment reaches the number of transmissions configured by the base station, the user equipment stops the transmission on the supplementary network equipment; or the user equipment does not need to detect the busy-idle condition of the channel where the supplementary network equipment is located, and directly starts uplink transmission at the preset moment. Optionally, the base station configures a specific transmission moment of the user equipment on the access network equipment. For example, the base station may configure the transmission moment through an SFN and a subframe number, and may also notify the user equipment of immediately starting once or multiple transmissions on the access network equipment through a PDCCH. At this time, the user equipment does not need to detect the busy-idle condition of the channel where the supplementary network equipment is located, and directly starts uplink transmission. By means of scheduling of the base station, collision may be avoided when the user equipment transmits data on the supplementary network, the uplink transmission time delay is reduced, and the system performance is improved.

Figure 3:
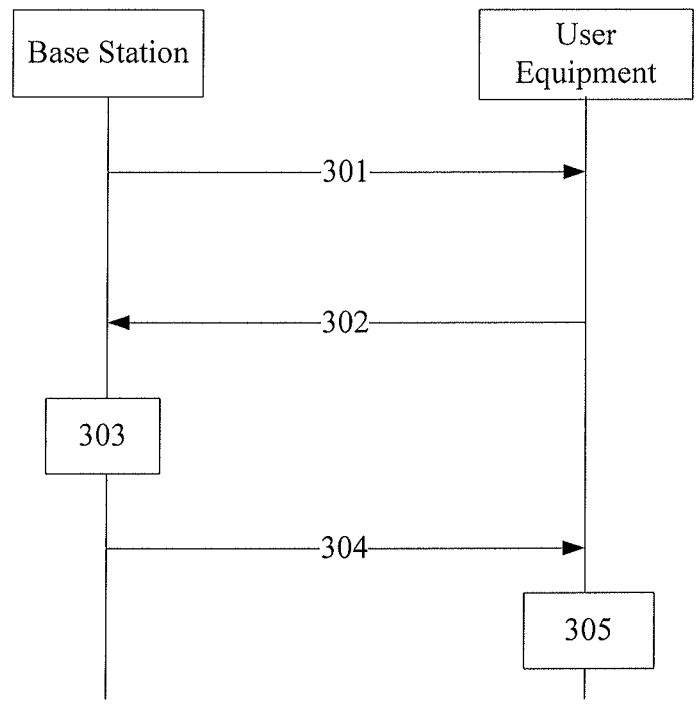
FIG. 3 is a schematic diagram of a flow of another data offload transmission method provided by the embodiment 1.

The embodiment of the present invention provides a data offload transmission method, and as shown in FIG. 3, the method includes the following steps:

301. a base station sends a parameter reporting indication to the user equipment.

In the embodiment of the present invention, the uplink data transmission of the user equipment in a supplementary network is specifically scheduled by the base station, the base station needs to clearly understand the data transmission quality between the user equipment and the base station, so as to perform the scheduling processing. Thus, the base station needs to know the transmission performance parameter of the user equipment on the supplementary network, and the base station may send the parameter reporting indication to the user equipment, for requesting the user equipment to report the transmission performance parameter.

302. The user equipment receives the parameter reporting indication, and reports the transmission performance parameter of the user equipment on the supplementary network to the base station according to the parameter reporting indication.

After receiving the parameter reporting indication, the user equipment reports the transmission performance parameter to the base station, and the transmission performance parameter includes at least one of parameters of data transmission time delay and a signal quality parameter. Wherein, the signal quality parameter includes an RSSI, of course, the signal quality parameter may also be other parameters capable of indicating the quality of a signal, and in the embodiment, the signal quality parameter adopted by us is the RSSI. The data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is the RSSI, the signal strength herein may be the average/maximal/minimal RSSI of the user equipment within the measurement cycle, and is not limited herein.

It should be noted that, the user equipment may independently send the transmission performance parameter measured by itself to the base station periodically, and does not need to report the transmission performance parameter according to the parameter reporting indication.

303. The base station obtains the transmission performance parameter, and configures user transmission restriction according to the transmission performance parameter.

The base station may receive the transmission performance parameter, of course, the base station itself may also measure the transmission performance parameter, after obtaining the transmission performance parameter, the base station configures the user transmission restriction according to the transmission performance parameter, the specific process is as follows: if the transmission performance parameter satisfies: the data transmission time delay exceeds a preset time delay 1 and/or the RSSI is lower than a preset RSSI value 1, then the user transmission restriction is that the user equipment stops the data transmission on the supplementary network. If the transmission performance parameter satisfies: the data transmission time delay exceeds a preset time delay 2 and/or the RSSI is lower than a preset RSSI value 2, then the user transmission restriction is that the user equipment decreases a data segment length to a preset segment value.

Wherein, the preset time delay 1 is larger than the preset time delay 2; and the preset RSSI value 1 is lower than the preset RSSI value 2. When the data transmission time delay exceeds the preset time delay 1 and/or the RSSI is lower than the preset RSSI value 1, it indicates that the data transmission quality between the user equipment and the base station is the poorest, at this time, the user transmission restriction configured for the user equipment by the base station is to enable the user equipment to stop the data transmission on the supplementary network, so as to avoid frequent collision, reduce the data transmission delay of uplink transmission of the user equipment and improve the system performance. If not, the user equipment starts data transmission. When the data transmission time delay exceeds the preset time delay 2 and/or the RSSI is lower than the preset RSSI value 2, it indicates that the data transmission quality between the user equipment and the base station is relatively poor, at this time, the user transmission restriction configured for the user equipment by the base station is to enable the user equipment to decrease the data segment length to the preset segment value; namely, an uplink transmission data packet is divided into smaller segments for transmission, which may reduce interference on a channel where access network equipment is located, and improve the offload data transmission quality. Optionally, the user equipment may also send the new transmission and/or retransmission data size of the user equipment on supplementary network equipment to the base station, for enabling the base station to configure the preset segment value for the user transmission restriction, according to the new transmission and/or retransmission data size on the supplementary network equipment, when the data transmission time delay exceeds the preset time delay threshold 2 and/or the RSSI is lower than the preset RSSI threshold 2. Wherein, when newly transmitting data to the supplementary network, the user equipment may send, to the base station, the data size of the new transmission data, namely a new transmission data size; when retransmitting certain data to the supplementary network, the user equipment may also send the data size of the retransmission data to the base station; of course, when the new transmission and/or retransmission data size onto the supplementary network equipment is larger than a set threshold, the user equipment may also report the new transmission and/or retransmission data size to the base station. When the data transmission time delay exceeds the preset time delay threshold 2 and/or the RSSI is lower than the preset RSSI threshold 2, the user transmission restriction is to enable the user equipment to decrease the data segment length to the preset segment value. Wherein, the preset segment value may be set by the base station according to the new transmission and/or retransmission data size on the supplementary network equipment, and may also be manually set in the base station.

Optionally, the base station configures the user transmission restriction according to the transmission performance parameter, wherein the user transmission restriction may further include: the number of transmissions of the user equipment on the supplementary network; or start of data transmission by the user equipment at a preset moment. The base station may configure the number of transmissions on the supplementary network equipment. The user equipment monitors the busy-idle condition of the channel where the supplementary network equipment is located. When the user equipment monitors that the channel, where the supplementary network equipment is located, is idle, the user equipment performs once transmission. When the user equipment reaches the number of transmissions configured by the base station, the user equipment stops the transmission on the supplementary network equipment. Optionally, the base station configures a specific transmission moment of the user equipment on the access network equipment. For example, the base station may configure the transmission moment through an SFN and a subframe number, and may also notify the user equipment of immediately starting once or multiple transmissions on the access network equipment through a PDCCH. At this time, the user equipment does not need to detect the busy-idle condition of the channel where the supplementary network equipment is located, and directly starts uplink transmission. By means of scheduling of the base station, collision may be avoided when the user equipment transmits data on the supplementary network, the uplink transmission time delay is reduced, and the system performance is improved.

It should be noted that, the manner in which the base station obtains the transmission performance parameter may also be as follows: the base station itself measures the transmission performance parameter.

304. The base station sends the user transmission restriction to the user equipment.

305. The user equipment receives the user transmission restriction sent by the base station and performs data transmission on the supplementary network according to the user transmission restriction.

After receiving the user transmission restriction, the user equipment immediately performs data transmission according to the user transmission restriction, if the user transmission restriction is that the user equipment stops the data transmission on the supplementary network, the user equipment stops the data transmission; if the user transmission restriction is that the user equipment decreases the data segment length to the preset segment value, the user equipment divides the transmission data into segments according to the preset segment value for transmission; if the user transmission restriction is the number of transmissions of the user equipment on the supplementary network, or start of data transmission by the user equipment at the preset moment, the user equipment monitors the busy-idle condition of the channel where the supplementary network equipment is located. When the user equipment monitors that the channel, where the supplementary network equipment is located, is idle, the user equipment performs once transmission. When the user equipment reaches the number of transmissions configured by the base station, the user equipment stops the transmission on the supplementary network equipment; or the user equipment does not need to detect the busy-idle condition of the channel where the supplementary network equipment is located, and directly starts uplink transmission at the preset moment.

Figure 4:
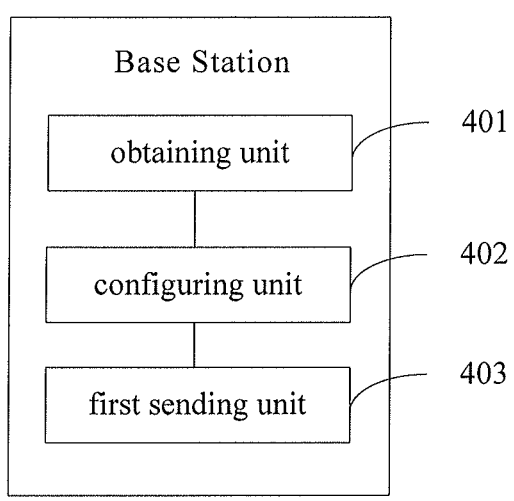
FIG. 4 is a block diagram of a structure of a base station provided by the embodiment 1.

The embodiment of the present invention further provides a base station, as shown in FIG. 4, the base station includes: an obtaining unit 401, a configuring unit 402, and a first sending unit 403.

The obtaining unit 401 is configured to obtain a transmission performance parameter of user equipment on a supplementary network.

The transmission performance parameter includes at least one of parameters of data transmission time delay and a signal quality parameter. Wherein, the signal quality parameter includes an RSSI (Received Signal Strength Indication, received signal strength indication), of course, the signal quality parameter may also be other parameters capable of indicating the quality of a signal, in the embodiment, the signal quality parameter adopted by us is the RSSI. The data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is the RSSI, the signal strength herein may be the average/maximal/minimal RSSI of the user equipment within the measurement cycle, and is not limited herein.

Optionally, the obtaining unit 401 obtains the transmission performance parameter in two manners: one is that the base station itself measures the transmission performance parameter; and the other is that the user equipment reports the transmission performance parameter to the base station after measuring the same. Further, when the latter method is adopted, the base station may send a parameter reporting indication to the user equipment, for enabling the user equipment to report the transmission performance parameter to the base station according to the parameter reporting indication; or the first sending unit 403 of the user equipment independently reports the transmission performance parameter to the base station.

The configuring unit 402 is configured to configure a user transmission restriction according to the transmission performance parameter.

The configuring unit 402 of the base station configures the user transmission restriction according to the transmission performance parameter, specifically including:

if the transmission performance parameter satisfies: the data transmission time delay exceeds a preset time delay 1 and/or the RSSI is lower than a preset RSSI threshold 1, then the user transmission restriction configured by the configuring unit 402 is that the user equipment stops the data transmission on the supplementary network. If the transmission performance parameter satisfies: the data transmission time delay exceeds a preset time delay threshold 2 and/or the RSSI is lower than a preset RSSI threshold 2, then the user transmission restriction configured by the configuring unit 402 is that the user equipment decreases a data segment length to a preset segment value. Wherein, the preset time delay threshold 1 is larger than the preset time delay threshold 2; and the preset RSSI threshold 1 is lower than the preset RSSI threshold 2. When the data transmission time delay exceeds the preset time delay threshold 1 and/or the RSSI is lower than the preset RSSI threshold 1, it indicates that the data transmission quality between the user equipment and the base station is the poorest, at this time, the user transmission restriction configured for the user equipment by the configuring unit 402 is to enable the user equipment to stop the data transmission on the supplementary network, so as to avoid frequent collision, reduce the data transmission delay of uplink transmission of the user equipment and improve the system performance. If not, the user equipment starts data transmission. When the data transmission time delay exceeds the preset time delay threshold 2 and/or the RSSI is lower than the preset RSSI threshold 2, it indicates that the data transmission quality between the user equipment and the base station is relatively poor, at this time, the user transmission restriction configured for the user equipment by the configuring unit 402 is to enable the user equipment to decrease the data segment length to the preset segment value; namely, an uplink transmission data packet is divided into smaller segments for transmission, which may reduce interference on a channel where access network equipment is located, and improve the offload data transmission quality. Optionally, the obtaining unit 401 is further configured to receive a new transmission and/or retransmission data size of the user equipment on supplementary network equipment, which is reported by the user equipment. Wherein, when newly transmitting data to the supplementary network, the user equipment may send, to the base station, the data size of the new transmission data, namely a new transmission data size; when retransmitting certain data to the supplementary network, the user equipment may also send the data size of the retransmission data to the base station; of course, when the new transmission and/or retransmission data size onto the supplementary network equipment is larger than a set threshold, the user equipment may also report the new transmission and/or retransmission data size to the base station. When the data transmission time delay exceeds the preset time delay threshold 2 and/or the RSSI is lower than the preset RSSI threshold 2, the user transmission restriction is to enable the user equipment to decrease the data segment length to the preset segment value. Wherein, the preset segment value may be set by the configuring unit 402 according to the new transmission and/or retransmission data size on the supplementary network equipment.

Optionally, the configuring unit 402 configures the user transmission restriction according to the transmission performance parameter, wherein the user transmission restriction may further include: the number of transmissions of the user equipment on the supplementary network; or start of data transmission by the user equipment at a preset moment. The base station may configure the number of transmissions on the supplementary network equipment. The user equipment monitors the busy-idle condition of the channel where the supplementary network equipment is located. When the user equipment monitors that the channel, where the supplementary network equipment is located, is idle, the user equipment performs once transmission. When the user equipment reaches the number of transmissions configured by the base station, the user equipment stops the transmission on the supplementary network equipment. Optionally, the base station configures a specific transmission moment of the user equipment on the access network equipment. For example, the base station may configure the transmission moment through an SFN and a subframe number, may also notify the user equipment of immediately starting once or multiple transmissions on the access network equipment through a PDCCH. At this time, the user equipment does not need to detect the busy-idle condition of the channel where the supplementary network equipment is located, and directly starts uplink transmission. By means of scheduling of the base station, collision may be avoided when the user equipment transmits data on the supplementary network, the uplink transmission time delay is reduced, and the system performance is improved.

The first sending unit 403 is configured to send the user transmission restriction to the user equipment, for enabling the user equipment to perform data transmission according to the user transmission restriction.

Figure 5:
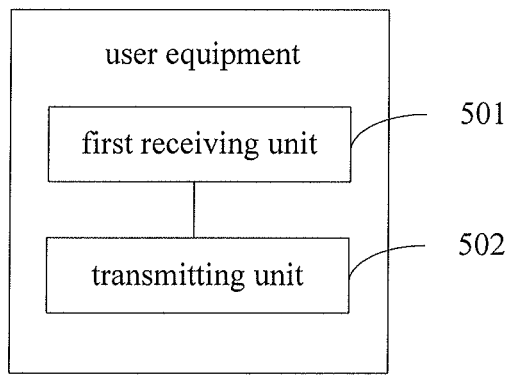
FIG. 5 is a block diagram of a structure of user equipment provided by the embodiment 1.

The embodiment of the present invention further provides user equipment, as shown in FIG. 5, the user equipment includes: a first receiving unit 501 and a transmitting unit 502.

The first receiving unit 501 is configured to receive a user transmission restriction sent by a base station.

After obtaining a transmission performance parameter, the base station configures the user transmission restriction according to the transmission performance parameter, and sends the user transmission restriction to the user equipment. The base station obtains the transmission performance parameter in two manners: one is that the base station itself measures the transmission performance parameter; and the other is that the user equipment reports the transmission performance parameter to the base station after measuring the same. Further, when the user equipment reports the transmission performance parameter to the base station after measuring the same, the base station may send a parameter reporting indication to the user equipment, for enabling the user equipment to report the transmission performance parameter to the base station according to the parameter reporting indication; or the user equipment independently reports the transmission performance parameter to the base station. The transmission performance parameter includes at least one of parameters of data transmission time delay and a signal quality parameter. Wherein, the signal quality parameter includes an RSSI, of course, the signal quality parameter may also be other parameters capable of indicating the quality of a signal, and in the embodiment, the signal quality parameter adopted by us is the RSSI. The data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is the RSSI, the signal strength herein may be the average/maximal/minimal RSSI of the user equipment within the measurement cycle, and is not limited herein.

After obtaining the transmission performance parameter, the base station judges the transmission quality between the user equipment and the base station according to the transmission performance parameter, configures the user transmission restriction hereby, and sends the user transmission restriction to the user equipment. The first receiving unit 501 of the user equipment receives the user transmission restriction.

The transmitting unit 502 is configured to perform data transmission on the supplementary network according to the user transmission restriction.

After the first receiving unit 501 of the user equipment receives the user transmission restriction, the transmitting unit 502 immediately performs data transmission according to the user transmission restriction, if the user transmission restriction is that the user equipment stops the data transmission on the supplementary network, the transmitting unit 502 of the user equipment immediately stops the data transmission; if the user transmission restriction is that the user equipment decreases the data segment length to the preset segment value, the transmitting unit 502 of the user equipment divides the transmission data into segments according to the preset segment value for transmission; if the user transmission restriction is the number of transmissions of the user equipment on the supplementary network or start of data transmission by the user equipment at the preset moment, the user equipment monitors the busy-idle condition of the channel where the supplementary network equipment is located. When the user equipment monitors that the channel, where the supplementary network equipment is located, is idle, the transmitting unit 502 of the user equipment performs once transmission. When the user equipment reaches the number of transmissions configured by the base station, the transmitting unit 502 of the user equipment stops data transmission on the supplementary network equipment; or the user equipment does not need to detect the busy-idle condition of the channel where the supplementary network equipment is located, and the transmitting unit 502 directly starts uplink transmission at the preset moment.

Figure 6:
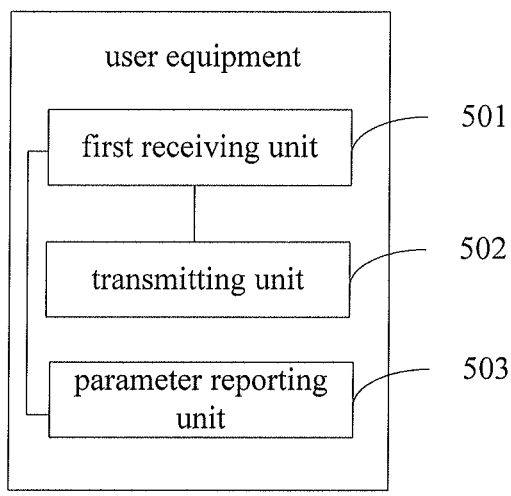
FIG. 6 is a block diagram of a structure of another user equipment provided by the embodiment 1.

Further, as shown in FIG. 6, the user equipment further includes a parameter reporting unit 503, the parameter reporting unit 503 is configured to report the transmission performance parameter to the base station, before the first receiving unit 501 receives the user transmission restriction sent by the base station, for enabling the base station to configure the user transmission restriction according to the transmission performance parameter. Optionally, the first receiving unit 501 is further configured to receive a parameter reporting indication sent by the base station, before the parameter reporting unit reports the transmission performance parameter to the base station, for enabling the user equipment to report the transmission performance parameter to the base station according to the parameter reporting indication.

Optionally, the parameter reporting unit 503 may be also configured to report the new transmission and/or retransmission data size of the user equipment on supplementary network equipment to the base station, for enabling the base station to set the preset segment value for the user transmission restriction, according to the new transmission and/or retransmission data size on the supplementary network equipment, when the data transmission time delay exceeds a preset time delay threshold 2 and/or the RSSI is lower than a preset RSSI threshold 2. Wherein, when newly transmitting data to the supplementary network, the user equipment may send, to the base station, the data size of the new transmission data, namely a new transmission data size; when retransmitting certain data to the supplementary network, the user equipment may also send the data size of the retransmission data to the base station; of course, when the new transmission and/or retransmission data size onto the supplementary network equipment is larger than a set threshold, the user equipment may also report the new transmission and/or retransmission data size to the base station. When the data transmission time delay exceeds the preset time delay threshold 2 and/or the RSSI is lower than the preset RSSI threshold 2, the user transmission restriction is to enable the user equipment to decrease the data segment length to a preset segment value. Wherein, the preset segment value may be set by the base station according to the new transmission and/or retransmission data size on the supplementary network equipment.

Figure 7:
FIG. 7 is a schematic diagram of a structure of a data offload transmission system provided by the embodiment 1.

The embodiment of the present invention further provides a data offload transmission system, as shown in FIG. 7, the system includes a base station 71 and user equipment 72.

After obtaining a transmission performance parameter, the base station 71 configures a user transmission restriction according to the transmission performance parameter, and then sends the user transmission restriction to the user equipment 72, and the user equipment 72 performs data transmission on a supplementary network according to the user transmission restriction.

The base station 71 may obtain the transmission performance parameter in the following manner; the base station 71 itself measures the transmission performance parameter, or the user equipment 72 reports the transmission performance parameter after measuring the same. Optionally, the user equipment 72 may independently report the transmission performance parameter, or report the transmission performance parameter after receiving a parameter reporting indication sent by the base station 71.

The embodiment of the present invention provides a data offload transmission method, apparatus and system, the base station obtains the transmission performance parameter of the user equipment on the supplementary network, configures the user transmission restriction according to the transmission performance parameter, and sends the user transmission restriction to the user equipment, for enabling the user equipment to perform data transmission on the supplementary network according to the user transmission restriction. In this way, the base station is adopted to schedule uplink transmission of the user equipment on the supplementary network, thus multiple collisions and retransmissions may be avoided, to reduce the transmission time delay of uplink data.

Embodiment 2

Figure 8:
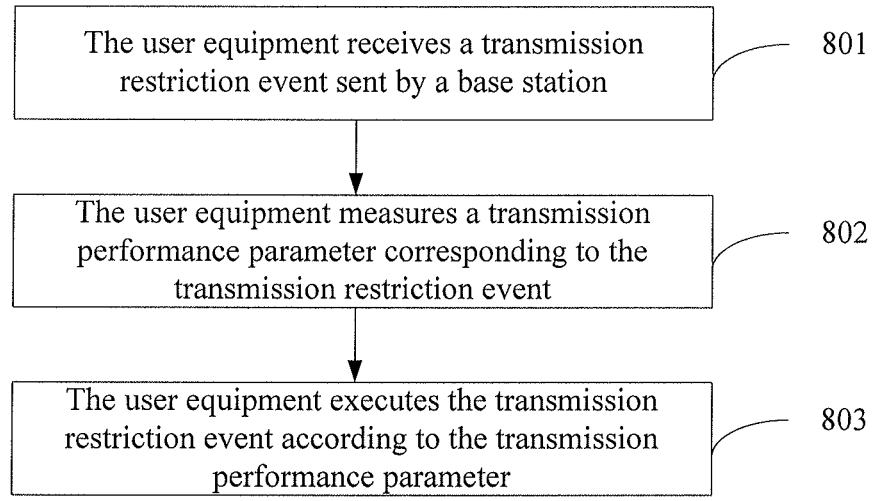
FIG. 8 is a schematic diagram of a flow of a data offload transmission method provided by an embodiment 2.

The embodiment of the present invention provides a data offload transmission method, the executive body of the method is user equipment, and as shown in FIG. 8, the method includes:

801. the user equipment receives a transmission restriction event sent by a base station.

The transmission restriction event includes: an event 1, when data transmission time delay is higher than a threshold 1, the user equipment stops data transmission on a supplementary network; an event 2, when the data transmission time delay is higher than a threshold 2, the user equipment decreases a data segment length to a threshold 3; an event 3, when the data transmission time delay is higher than a threshold 4, the user equipment only transmits data on an RB (Radio Bear, radio bear) or a logic channel on the supplementary network; an event 4, when the signal strength is lower than a threshold 5, the user equipment stops the data transmission on the supplementary network; an event 5, when the signal strength is lower than a threshold 6, the user equipment decreases the data segment length to a threshold 7; and an event 6, when the signal strength is lower than a threshold 8, the user equipment only transmits data on the RB or logic channel on the supplementary network.

The event 1 and the event 4 indicate that the user equipment stops the data transmission on the supplementary network under the poorest data transmission condition of the user equipment; the event 2 and the event 5 indicate that the user equipment decreases the data segment length, namely, divides a data packet to be transmitted into smaller segments for transmission in case that the data transmission condition of the user equipment is relatively poor; and the event 3 and the event 6 indicate that the user equipment only transmits data on the RB or logic channel corresponding to the user equipment on the supplementary network, in case that the data transmission condition of the user equipment is generally poor.

802. The user equipment measures a transmission performance parameter corresponding to the transmission restriction event.

After receiving the transmission restriction event sent by the base station, the user equipment will measure the transmission performance parameter corresponding to the transmission restriction event. The transmission performance parameter herein is the transmission performance parameter of the user equipment on the supplementary network.

Optionally, if the transmission restriction event received by the user equipment is the event 1, the event 2 or the event 3, the transmission performance parameter corresponding to the transmission restriction event is the data transmission time delay; and if the transmission restriction event received by the user equipment is the event 4, the event 5 or the event 6, the transmission performance parameter corresponding to the transmission restriction event is the signal strength.

The user equipment measures the corresponding transmission performance parameter according to the transmission restriction event: the data transmission time delay and/or signal strength. Wherein, the data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength may be an RSSI or other parameters capable of marking the signal strength, the RSSI is taken herein as an example, the signal strength may be the average/maximal/minimal RSSI of the user equipment of within the measurement cycle, and is not limited herein.

803. The user equipment executes the transmission restriction event according to the transmission performance parameter.

After measuring the transmission performance parameter, namely, the data transmission time delay and/or the signal strength, the user equipment executes the transmission restriction event according to the measured transmission performance parameter. For example, if the measured data transmission time delay is higher than the threshold 1, the event 1 is executed, namely, the user equipment stops the data transmission on the supplementary network; if the measured data transmission time delay is higher than the threshold 4, the event 3 is executed, namely, the user equipment only transmits data on the RB or logic channel corresponding to the user equipment on the supplementary network; and if the measured data do not trigger the transmission restriction event, for example, the measured data transmission time delay is lower than the threshold 4, the user equipment normally performs uplink data transmission. Similarly, if the transmission performance parameter measured by the user equipment is the signal strength, the event 4, the event 5 or the event 6 is executed according to the measured signal strength; and if the measured data do not trigger the transmission restriction event, the user equipment normally performs uplink data transmission.

The embodiment of the present invention provides a data offload transmission method, the executive body of the method is a base station, and the method includes:

the base station sends a transmission restriction event to user equipment, for enabling the user equipment to measure a transmission performance parameter corresponding to the transmission restriction event and execute the transmission restriction event according to the transmission performance parameter; wherein, the transmission restriction event includes at least one of the following events: an event 1, when data transmission time delay is higher than a threshold 1, the user equipment stops data transmission on a supplementary network; an event 2, when the data transmission time delay is higher than a threshold 2, the user equipment decreases a data segment length to a threshold 3; an event 3, when the data transmission time delay is higher than a threshold 4, the user equipment only transmits data on an RB or a logic channel on the supplementary network; an event 4, when the signal strength is lower than a threshold 5, the user equipment stops the data transmission on the supplementary network; an event 5, when the signal strength is lower than a threshold 6, the user equipment decreases the data segment length to a threshold 7; and an event 6, when the signal strength is lower than a threshold 8, the user equipment only transmits data on the radio bear RB or logic channel on the supplementary network.

In the data offload transmission method provided by the embodiment of the present invention, the base station uniformly schedules the uplink transmission data of the user equipment, namely, the base station sends the transmission restriction event to the user equipment, for enabling the user equipment to independently schedule its own upload data according to the transmission restriction event. Optionally, the steps of the user equipment independently scheduling the data are the above-mentioned steps 801-803, and will not be repeated redundantly herein.

Figure 9:
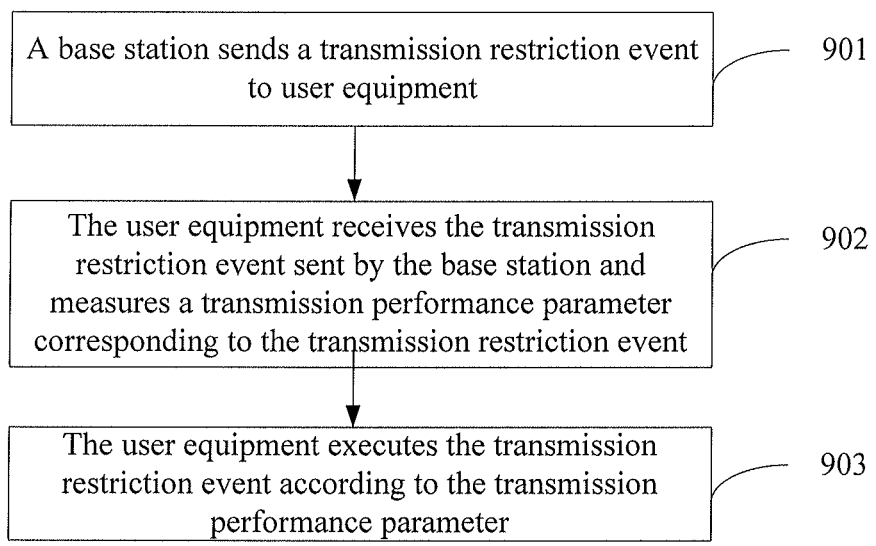
FIG. 9 is a schematic diagram of a flow of another data offload transmission method provided by the embodiment 2.

The embodiment of the present invention provides a data offload transmission method, and as shown in FIG. 9, the method includes the following steps:

901. a base station sends a transmission restriction event to user equipment.

The transmission restriction event includes: an event 1, when data transmission time delay is higher than a threshold 1, the user equipment stops data transmission on a supplementary network; an event 2, when the data transmission time delay is higher than a threshold 2, the user equipment decreases a data segment length to a threshold 3; an event 3, when the data transmission time delay is higher than a threshold 4, the user equipment only transmits data on an RB or a logic channel on the supplementary network; an event 4, when the signal strength is lower than a threshold 5, the user equipment stops the data transmission on the supplementary network; an event 5, when the signal strength is lower than a threshold 6, the user equipment decreases the data segment length to a threshold 7; and an event 6, when the signal strength is lower than a threshold 8, the user equipment only transmits data on the RB or logic channel on the supplementary network. The base station may send any one of the above-mentioned 6 events to the user equipment.

The event 1 and the event 4 indicate that the user equipment stops the data transmission on the supplementary network under the poorest data transmission condition of the user equipment; the event 2 and the event 5 indicate that the user equipment decreases the data segment length, namely, divides a data packet to be transmitted into smaller segments for transmission in case that the data transmission condition of the user equipment is relatively poor; and the event 3 and the event 6 indicate that the user equipment only transmits data on an RB or a logic channel corresponding to the user equipment on the supplementary network, in case that the data transmission condition of the user equipment is generally poor.

902. The user equipment receives the transmission restriction event sent by the base station and measures a transmission performance parameter corresponding to the transmission restriction event.

Optionally, if the transmission restriction event received by the user equipment is the event 1, the event 2 or the event 3, the transmission performance parameter corresponding to the transmission restriction event is the data transmission time delay, and the user equipment needs to measure the data transmission time delay; and if the transmission restriction event received by the user equipment is the event 4, the event 5 or the event 6, the transmission performance parameter corresponding to the transmission restriction event is the signal strength, and the user equipment needs to measure the signal strength.

The user equipment measures the corresponding transmission performance parameter according to the transmission restriction event: the data transmission time delay and/or the signal strength. Wherein, the data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is an RSSI, the signal strength herein may be the average/maximal/minimal RSSI of the user equipment within the measurement cycle, and is not limited herein.

903. The user equipment executes the transmission restriction event according to the transmission performance parameter.

After measuring the transmission performance parameter, namely, the data transmission time delay and/or the signal strength, the user equipment executes the transmission restriction event according to the measured transmission performance parameter. For example, if the measured data transmission time delay is higher than the threshold 1, the event 1 is executed, namely, the user equipment stops the data transmission on the supplementary network; if the measured data transmission time delay is higher than the threshold 4, the event 3 is executed, namely, the user equipment only transmits data on the RB or the logic channel corresponding to the user equipment on the supplementary network; and if the measured data do not trigger the transmission restriction event, for example, the measured data transmission time delay is lower than the threshold 4, the user equipment normally performs uplink data transmission. Similarly, if the transmission performance parameter measured by the user equipment is the signal strength, the event 4, the event 5 or the event 6 is executed according to the measured signal strength; and if the measured data do not trigger the transmission restriction event, the user equipment normally performs uplink data transmission.

Figure 10:
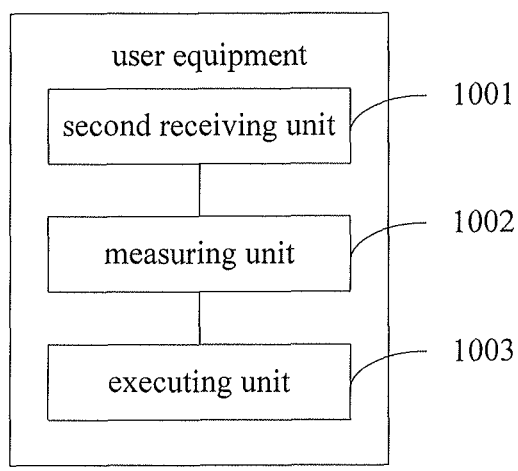
FIG. 10 is a block diagram of a structure of user equipment provided by the embodiment 2.

The embodiment of the present invention further provides user equipment, configured to finish the above-mentioned data offload transmission method. As shown in FIG. 10, the user equipment includes: a second receiving unit 1001, a measuring unit 1002 and an executing unit 1003.

The second receiving unit 1001 is configured to receive a transmission restriction event sent by a base station.

The transmission restriction event includes: an event 1, when data transmission time delay is higher than a threshold 1, the user equipment stops data transmission on a supplementary network; an event 2, when the data transmission time delay is higher than a threshold 2, the user equipment decreases a data segment length to a threshold 3; an event 3, when the data transmission time delay is higher than a threshold 4, the user equipment only transmits data on an RB or a logic channel on the supplementary network; an event 4, when the signal strength is lower than a threshold 5, the user equipment stops the data transmission on the supplementary network; an event 5, when the signal strength is lower than a threshold 6, the user equipment decreases the data segment length to a threshold 7; and an event 6, when the signal strength is lower than a threshold 8, the user equipment only transmits data on the RB or logic channel on the supplementary network.

The event 1 and the event 4 indicate that the user equipment stops the data transmission on the supplementary network under the poorest data transmission condition of the user equipment; the event 2 and the event 5 indicate that the user equipment decreases the data segment length, namely, divides a data packet to be transmitted into smaller segments for transmission in case that the data transmission condition of the user equipment is relatively poor; and the event 3 and the event 6 indicate that the user equipment only transmits data on an RB or a logic channel corresponding to the user equipment on the supplementary network, in case that the data transmission condition of the user equipment is generally poor.

The measuring unit 1002 is configured to measure a transmission performance parameter corresponding to the transmission restriction event.

After the second receiving unit 1001 of the user equipment receives the transmission restriction event sent by the base station, the measuring unit 1002 will measure the transmission performance parameter corresponding to the transmission restriction event.

Optionally, if the transmission restriction event received by the user equipment is the event 1, the event 2 or the event 3, the transmission performance parameter corresponding to the transmission restriction event is the data transmission time delay; and if the transmission restriction event received by the user equipment is the event 4, the event 5 or the event 6, the transmission performance parameter corresponding to the transmission restriction event is the signal strength.

The measuring unit 1002 of the user equipment measures the corresponding transmission performance parameter according to the transmission restriction event: data transmission time delay and/or signal strength. Wherein, the data transmission time delay is a time difference from a data transmission beginning moment to a moment that receiving the confirmation feedback from the base station; the data transmission time delay herein may be within a measurement cycle, the average/maximal/minimal transmission time delay during data transmission of the user equipment is determined by specific conditions and is not limited herein. The signal strength parameter is an RSSI, the signal strength herein may be the average/maximal/minimal RSSI of the user equipment within the measurement cycle, and is not limited herein.

The executing unit 1003 is configured to execute the transmission restriction event according to the transmission performance parameter.

After the measuring unit 1002 measures the transmission performance parameter, namely, the data transmission time delay and/or the signal strength, the executing unit 1003 of the user equipment executes the transmission restriction event according to the measured transmission performance parameter. For example, if the measured data transmission time delay is higher than the threshold 1, the event 1 is executed, namely, the user equipment stops the data transmission on the supplementary network; if the measured data transmission time delay is higher than the threshold 4, the event 3 is executed, namely, the user equipment only transmits data on the RB or logic channel corresponding to the user equipment on the supplementary network; and if the measured data do not trigger the transmission restriction event, for example, the measured data transmission time delay is lower than the threshold 4, the user equipment normally performs uplink data transmission. Similarly, if the transmission performance parameter measured by the user equipment is the signal strength, the event 4, the event 5 or the event 6 is executed according to the measured signal strength; and if the measured data do not trigger the transmission restriction event, the user equipment normally performs uplink data transmission.

The embodiment of the present invention further provides a base station, configured to finish the above-mentioned data offload transmission method, and the base station includes a sending unit. The sending unit is configured to send a transmission restriction event to user equipment, for enabling the user equipment to measure a transmission performance parameter corresponding to the transmission restriction event, and execute the transmission restriction event according to the transmission performance parameter.

The base station uniformly schedules the uplink transmission data of the user equipment, namely, the sending unit of the base station sends the transmission restriction event to the user equipment, for enabling the user equipment to independently schedule its own upload data according to the transmission restriction event. Optionally, the steps of the user equipment independently scheduling the data are the above-mentioned steps 801-803, and will not be repeated redundantly herein.

Figure 11:
FIG. 11 is a schematic diagram of a structure of a data offload transmission system provided by the embodiment 2.

The embodiment of the present invention further provides a data offload transmission system, as shown in FIG. 11, the system includes: user equipment 111 and a base station 112.

The base station 112 is configured to send a user transmission restriction event to the user equipment. The user equipment 111 is configured to receive the transmission restriction event sent by the base station, measure a transmission performance parameter corresponding to the transmission restriction event, and then execute the transmission restriction event according to the transmission performance parameter.

The embodiment of the present invention provides a data offload transmission method, apparatus and system, the user equipment receives the transmission restriction event sent by the base station, measures the transmission performance parameter corresponding to the transmission restriction event, and then executes the transmission restriction event according to the transmission performance parameter, thus the base station uniformly schedules the data uploaded by the user equipment, to avoid multiple collisions and retransmissions, so as to ensure the transmission time delay of uplink data.

Those of ordinary skill in the art may understand that all or a part of the steps in the above-mentioned method embodiments may be performed with a program instructing corresponding hardware, the foregoing program may be stored in a computer readable storage medium, and when being executed, the program may execute the steps included in the above-mentioned method embodiments; and the foregoing storage medium includes a variety of media capable of storing program codes, such as an ROM, an RAM, a magnetic disk, an optical disk or the like.

The foregoing descriptions are merely specific implementations of the present invention, but the protection scope of the present invention is not limited to this. Any skilled one who is familiar with the art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. A data offload transmission method, comprising:
   obtaining, by a base station, a transmission performance parameter of user equipment on a supplementary network, wherein the supplementary network differs from a network where the base station resides on, wherein the transmission performance parameter comprises at least one of a data transmission time delay parameter and a signal quality parameter; wherein the signal quality parameter comprises a received signal strength indication RSSI; and configuring, by the base station, a user transmission restriction according to the transmission performance parameter, and sending the user transmission restriction to the user equipment, for enabling the user equipment to perform data transmission on the supplementary network according to the user transmission restriction; the configuring, comprises:

if the transmission performance parameter satisfies at least one of: the data transmission time delay exceeds a preset time delay threshold 1, and the RSSI is lower than a preset RSSI threshold 1, then, configuring, by the base station, the user transmission restriction such that the user equipment stops the data transmission on the supplementary network;

if the transmission performance parameter satisfies at least one of: the data transmission time delay exceeds the preset time delay threshold 2, and the RSSI is lower than the preset RSSI threshold 2, then configuring, by the base station, the user transmission restriction such that the user equipment decreases a data segment length to a preset segment value; wherein, the preset time delay threshold 1 is larger than the preset RSSI threshold 2, and the preset RSSI threshold 1 is smaller than the preset RSSI threshold 2.

2. The method of claim 1, wherein the obtaining, by the base station, the transmission performance parameter, comprises:

receiving, by the base station, the transmission performance parameter reported by the user equipment.

3. The method of claim 1, wherein the obtaining, by the base station, the transmission performance parameter, comprises:

measuring, by the base station, the transmission performance parameter.

4. The method of claim 1, wherein before configuring the user transmission restriction according to the transmission performance parameter, further receiving, by the base station, a new transmission and/retransmission data size of the user equipment on supplementary network equipment reported by the user equipment; and when the data transmission time delay exceeds the preset time delay threshold 2 and/or the RSSI is lower than the preset RSSI threshold 2, setting, by the base station, the preset segment value of the user transmission restriction according to the new transmission and/retransmission data size of on the supplementary network equipment.

5. A data offload transmission method, comprising:

receiving, by user equipment, a user transmission restriction sent by a base station, wherein the user transmission restriction is configured by the base station according to a transmission performance parameter of the user equipment on a supplementary network; and performing, by the user equipment, data transmission on the supplementary network according to the user transmission restriction, wherein the supplementary network differs from a network where the base station resides on;

wherein the transmission performance parameter comprises at least one of a data transmission time delay parameter and a signal quality parameter; wherein the signal quality parameter comprises a received signal strength indication RSSI;

wherein the user transmission restriction is configured by the base station according to the transmission performance parameter, wherein the configuring comprises:

if the transmission performance parameter satisfies at least one of: the data transmission time delay exceeds a preset time delay threshold 1, and the RSSI is lower than a preset RSSI threshold 1, then, configuring, by the base station, the user transmission restriction such that the user equipment stops the data transmission on the supplementary network;

if the transmission performance parameter satisfies at least one of: the data transmission time delay exceeds the preset time delay threshold 2, and the RSSI is lower than the preset RSSI threshold 2, then configuring, by the base station, the user transmission restriction such that the user equipment decreases a data segment length to a preset segment value; wherein, the preset time delay threshold 1 is larger than the preset RSSI threshold 2, and the preset RSSI threshold 1 is smaller than the preset RSSI threshold 2.

6. The method of claim 1, wherein before the receiving, by the user equipment, the user transmission restriction sent by the base station, further comprising:

reporting, by the user equipment, a transmission performance parameter of the user equipment on the supplementary network to the base station, for enabling the base station to configure the user transmission restriction according to the transmission performance parameter; wherein the transmission performance parameter comprises at least one of parameters of data transmission time delay and a signal quality parameter, and the signal quality parameter comprises an RSSI.

7. The method of claim 6, wherein before the reporting, by the user equipment, the transmission performance parameter to the base station, further comprising:

receiving, by the user equipment, a parameter reporting indication sent by the base station, for enabling the user equipment to report the transmission performance parameter to the base station according to the parameter reporting indication.

8. The method of claim 5, wherein the user data transmission restriction comprises at least one of: stop of data transmission by the user equipment on the supplementary network, configuration of the user equipment to decrease a data segment length to a preset segment value, the number of transmissions of the user equipment on the supplementary network, and start of the data transmission by the user equipment at a preset moment.

9. The method of claim 5, wherein further reporting, by the user equipment, a new transmission and/or retransmission data size of the user equipment on supplementary network equipment to the base station, for enabling the base station to set the preset segment value when configuring the user transmission restriction, wherein the new transmission and/or retransmission data size is a new transmission and/or retransmission data size reported by the user equipment to the base station when newly transmitting or retransmitting data to the base station, or the new transmission and/or retransmission data size is a new transmission and/or retransmission data size reported by the user equipment to the base station when the new transmission and/or retransmission data size onto the supplementary network is larger than a set threshold.

10. A base station, comprising:

a receiver, configured to obtain a transmission performance parameter of user equipment on a supplementary network, wherein the transmission performance parameter comprises at least one of a data transmission parameter and a signal quality parameter; wherein the signal quality parameter comprises a received signal strength indication RSSI;

a processor, configured to configure a user transmission restriction according to the transmission performance parameter; and a transmitter, configured to send the user transmission restriction to the user equipment, for enabling the user equipment to perform data transmission on the supplementary network according to the user transmission restriction, wherein the supplementary network differs from a network where the base station resides on;

wherein the processor configures user transmission restriction according to the transmission performance parameter, wherein the configuring comprises:

if the transmission performance parameter satisfies at least one of: the data transmission time delay exceeds a preset time delay threshold 1, and the RSSI is lower than a preset RSSI threshold 1, then the processor configures the user transmission restriction such that the user equipment stops the data transmission on the supplementary network;

if the transmission performance parameter satisfies at least one of: the data transmission time delay exceeds the preset time delay threshold 2, and the RSSI is lower than the preset RSSI threshold 2, then the processor configures the user transmission restriction such that the user equipment decreases a data segment length to a preset segment value; wherein, the preset time delay threshold 1 is larger than the preset RSSI threshold 2, and the preset RSSI threshold 1 is smaller than the preset RSSI threshold 2.

11. The base station of claim 10, wherein the receiver is configured to receive the transmission performance parameter reported by the user equipment.

12. The base station of claim 10, wherein the receiver is further configured to measure the transmission performance parameter.

13. The base station of claim 10, wherein the receiver is further configured to receive a new transmission and/or retransmission data size of the user equipment on supplementary network equipment reported by the user equipment, for enabling the processor to set the preset segment value of the user transmission restriction according to the new transmission and/or retransmission data size on the supplementary network equipment, when the data transmission time delay exceeds the preset time delay threshold 2 and/or the RSSI is lower than the preset RSSI threshold 2.

14. User equipment, comprising:

a receiving circuit, configured to receive a user transmission restriction sent by a base station, wherein the user transmission restriction is configured by the base station according to a transmission performance parameter of the user equipment on a supplementary network; and a transmitting circuit, configured to perform data transmission on a supplementary network according to the user transmission restriction, wherein the supplementary network differs from a network where the base station resides on;

wherein the transmission performance parameter comprises at least one of a data transmission time delay parameter and a signal quality parameter; wherein the signal quality parameter comprises a received signal strength indication RSSI;

the user transmission restriction is configured by the base station according to the transmission performance parameter, wherein the configuring comprises:

if the transmission performance parameter satisfies at least one of: the data transmission time delay exceeds a preset time delay threshold 1, and the RSSI is lower than a preset RSSI threshold 1, then, configuring, by the base station, the user transmission restriction such that the user equipment stops the data transmission on the supplementary network;

if the transmission performance parameter satisfies at least one of: the data transmission time delay exceeds the preset time delay threshold 2, and the RSSI is lower than the preset RSSI threshold 2, then configuring, by the base station, the user transmission restriction in such a manner that the user equipment decreases a data segment length to a preset segment value; wherein, the preset time delay threshold 1 is larger than the preset RSSI threshold 2, and the preset RSSI threshold 1 is smaller than the preset RSSI threshold 2.

15. The user equipment of claim 14, further comprising: a processor, configured to report the transmission performance parameter of the user equipment on the supplementary network to the base station, before the receiving circuit receives the user transmission restriction sent by the base station, for enabling the base station to configure the user transmission restriction according to the transmission performance parameter; wherein the transmission performance parameter comprises at least one of parameters of data transmission time delay and a signal quality parameter, and the signal quality parameter comprises an RSSI; the user data transmission restriction comprises at least one of: stop of data transmission by the user equipment on the supplementary network, configuration of the user equipment to decrease a data segment length to a preset segment value, the number of transmissions of the user equipment on the supplementary network, and start of the data transmission by the user equipment at a preset moment.

16. The user equipment of claim 15, wherein the processor is further configured to report a new transmission and/or retransmission data size of the user equipment on supplementary network equipment to the base station, for enabling the base station to set the preset segment value when configuring the user transmission restriction, wherein the new transmission and/or retransmission data size is a new transmission and/or retransmission data size reported by the user equipment to the base station when newly transmitting or retransmitting data to the base station, or the new transmission and/or retransmission data size is a new transmission and/or retransmission data size reported by the user equipment to the base station when the new transmission and/or retransmission data size onto the supplementary network is larger than a set threshold.

17. The method of claim 1, wherein the user data transmission restriction comprises at least one of: stop of data transmission by the user equipment on the supplementary network, configuration of the user equipment to decrease a data segment length to a preset segment value, the number of transmissions of the user equipment on the supplementary network, and start of the data transmission by the user equipment at a preset moment.

18. The base station of claim 10, wherein the user data transmission restriction comprises at least one of: stop of data transmission by the user equipment on the supplementary network, configuration of the user equipment to decrease a data segment length to a preset segment value, the number of transmissions of the user equipment on the supplementary network, and start of the data transmission by the user equipment at a preset moment.

* * * * *